United States Patent [19]

Domschat

[11] Patent Number: 5,034,651
[45] Date of Patent: Jul. 23, 1991

[54] HIGH-VOLTAGE ELECTRODE

[75] Inventor: Klaus Domschat, Löerrach, Fed. Rep. of Germany

[73] Assignee: Eltex-Electrostatik-GmbH, Rhein, Fed. Rep. of Germany

[21] Appl. No.: 483,760

[22] Filed: Feb. 23, 1990

[51] Int. Cl.⁵ .............................................. H01J 1/30
[52] U.S. Cl. ................................. 313/351; 313/309
[58] Field of Search ................................. 313/309, 351

[56] References Cited

U.S. PATENT DOCUMENTS

| | | | |
|---|---|---|---|
| 2,277,712 | 3/1942 | Otto | 313/351 X |
| 2,312,723 | 3/1943 | Llewellyn | 313/309 X |
| 3,402,313 | 9/1968 | Gabor et al. | 313/351 X |
| 3,725,735 | 4/1973 | Beaulieu et al. | 313/351 X |

Primary Examiner—Palmer C. DeMeo
Attorney, Agent, or Firm—Antonelli, Terry, Stout & Kraus

[57] ABSTRACT

The invention relates to a high-voltage electrode with a plurality of individual electrodes arranged mutually in parallel, these electrodes being electrically connected in groups or all of them together and being characterized in that the high-voltage electrode exhibits an elongated, elastically deformable strip of an electrically insulating material; that the individual electrodes are arranged perpendicularly to the longitudinal extension of the strip and project past one of the longitudinal edges of the strip with their tips; and that an electric conductor is mounted in the longitudinal extension to at least one flat side of the strip.

12 Claims, 1 Drawing Sheet

HIGH-VOLTAGE ELECTRODE

FIELD OF THE INVENTION

The invention concerns a high-voltage electrode with a plurality of individual electrodes arranged mutually in parallel, the electrodes being electrically connected in groups or all of them together

BACKGROUND OF THE INVENTION

High-voltage electrodes are known in a large number of designs, and are also known as so-called corona discharge electrodes or emission electrodes.

Such electrodes are soldered together from individual resistors and/or discrete capacitors by means of wires and/or printed circuit boards and are then potted into a profiled shape. The profile, in this arrangement, is premilled, the complicated milled components accommodating printed circuit boards, guide members, and connectors, as well as connecting wires and soldering tin. Individual bores serve for housing the discrete components as well as the individual electrodes.

In total, the electrodes are produced practically by manual work, i.e. in an expensive way. Besides, the electrodes must in all cases be manufactured so that they fit the installation dimensions. A subsequent machining or processing or adaptation is practically impossible. Finally, the electrodes are to be located with their tips only along a straight line which is disadvantageous insofar as the usage purposes are thereby limited.

SUMMARY OF THE INVENTION

The invention is based on the object of producing an electrode of this type in a less expensive way so that adaptation to the installation dimensions and installation configurations can optionally be achieved subsequently and in a simpler way.

This object has been attained in a high-voltage electrode of the aforementioned type by means of this invention which comprises an elongated, elastically deformable strip of an electrically insulating material. Preferably the strip is an insulating substrate film having high dielectric strength and containing at least one conductor extending in parallel to the longitudinal extension of the strip, preferably an applied or integrated circuit interconnection, on a flat side of the strip, to which are connected a plurality or groups of individual electrodes extending perpendicularly to the longitudinal extension of the strip and projecting with their tips past a longitudinal edge of the strip, wherein the electrodes can be soldered or crimped onto the conductor. However, it is also possible to fashion the strip of two congruent component ribbons receiving between them the individual electrode wherein one or both of the component ribbons can be recessed for providing connections.

By means of this basic principle of the invention, it is possible to produce an electrode which is not rigid but rather can be manufactured in an almost endless fashion and can be rolled up after having been manufactured so that, when necessary, only a certain length of the electrode has to be rolled up, depending on the requirements of the installation dimensions. Besides, the electrode is flexible and elastic and can be utilized, for example, also in a curved shape for complicated usage purposes. Furthermore, the high-voltage electrode according to this invention can be produced at least in a semiautomatic way whereby the production costs are considerably reduced.

In case the high-voltage electrode is to have two separately switchable groups of individual electrodes, then respectively one conductor can be mounted to one of the two flat sides of the strip which are then connected to the electrodes. Based on the high dielectric strength of the film proper, separate potting according to the state of the art is unnecessary.

If the high-voltage electrode is to include resistors, the latter can be mounted perpendicularly to the longitudinal extension as discrete components. In an advantageous embodiment of the invention, the resistors, however, are fashioned as ceramic substrate resistors wherein the substrate has a substantially rectangular contour and is connected with one of its sides to the individual electrode and with the other one of its sides to the conductor; the substrate proper is glued to the flat side of the strip.

In a fully automatic production, there is mounted to one flat side of the strip not only the conductor, as a circuit interconnection, but also the resistor and/or the capacitor in the form of an SMD (surface mounted device). The tips are supplied in belt form and are automatically crimped onto the resistor.

A preferred example of the invention will be described in greater detail below with reference to the drawings.

Detailed Description Of The Disclosed Embodiment

Figure 1:
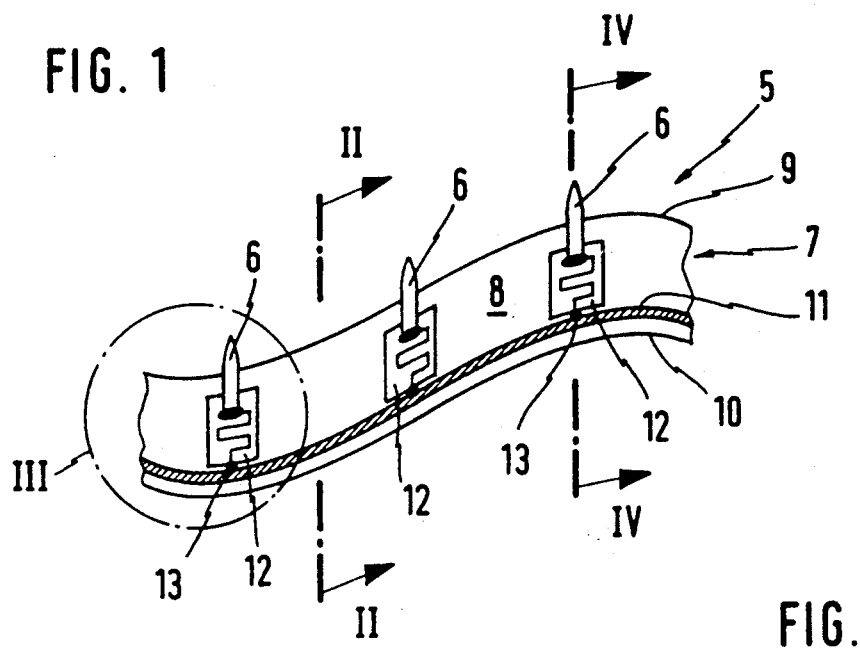
FIG. 1 shows a high-voltage electrode in accordance with this invention in a schematic perspective view.

The high-voltage electrode, denoted by 5 in its entirety, exhibits a plurality of individual electrodes 6 arranged mutually in parallel and being disposed on an elongated, elastically deformable strip 7 of an electrically insulating material, preferably an insulating substrate film of high dielectric strength. The electrodes 6 are arranged along one of the flat sides 8 of the strip in such a way that these electrodes project past the upper longitudinal edge 9 thereof.

Furthermore, a conductor 11 in the shape of a printed-circuit interconnection is provided on one flat side 8 of the two flat sides of the strip 7 in the proximity of the lower longitudinal edge 10 which is opposite to the upper edge 9. A resistor fashioned as a ceramic substrate resistor and denoted by 12 in its entirety is arranged between the circuit interconnection and the aforementioned upper longitudinal edge 9 of the strip 7. The resistor, as seen in top view, has a rectangular contour. The narrow sides of the rectangular resistor extend in parallel to the two longitudinal edges 9, 10 of the strip 7, and the long rims extend in parallel to the individual electrodes 6 arranged perpendicularly to the longitudinal extension of the strip. The ceramic substrate resistor is electrically connected at its lower end to the conductor 11, for example by means of a solder bond 13.

Figure 3:
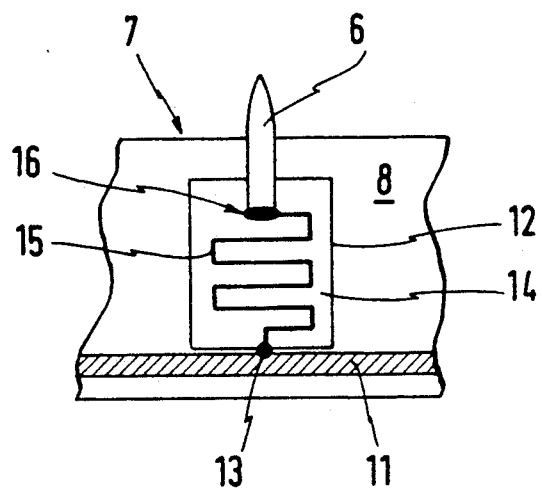
FIG. 3 shows the detail III according to FIG. 1.

The ceramic substrate resistor 12 is shown in greater detail in FIG. 3 in a top view. The resistor comprises a ceramic shim 14 with a substrate 15 of meander shape applied to the topside of the shim and constituting the resistor proper. In the upper zone of the ceramic substrate resistor 12, the individual electrode 6 is attached at the end of the substrate 15, for example by soldering, but preferably by crimping, at 16. At the bottom end of the substrate 15, the solder connection with the conductor 11 is shown schematically at 13.

Figure 2:
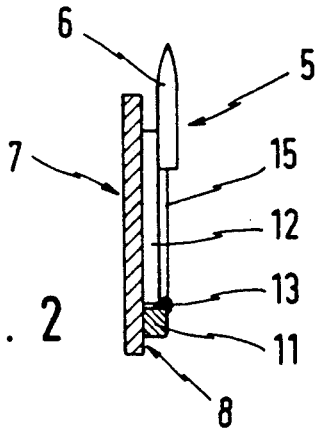
FIG. 2 shows a section II—II according to FIG. 1.
Figure 4:
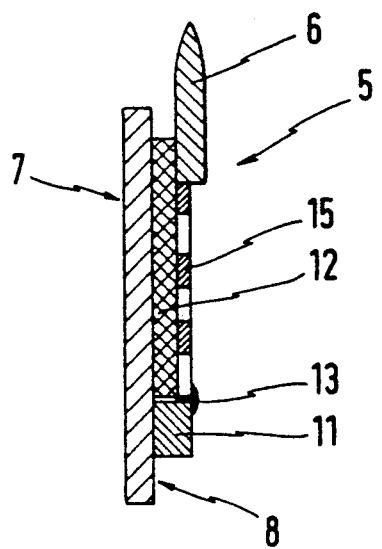
FIG. 4 shows a section IV—IV according to FIG. 1.

FIGS. 2 and 4 show various cross sections through the high-voltage electrode, denoted by 5 in its entirety; it can be seen that the ceramic substrate resistor 12 is applied, preferably glued, to one flat side 8 of the strip 7. The meander-shaped substrate 15 is applied to one of the planar front faces of the ceramic substrate resistor, which latter is known per se; the rear face is preferably joined by means of gluing to one flat side 8 of the strip 7.

I claim:

1. A high-voltage electrode comprising a plurality of individual electrodes with tips, said electrodes being arranged mutually in parallel, these electrodes being electrically connected in groups or all of them together, the high-voltage electrode including an elongated, elastically deformable strip of an electrically insulating material, individual electrodes of said plurality of electrodes being mounted on said strip such that they are arranged perpendicularly to the longitudinal extension of the strip with their tips projecting past one of the longitudinal edges of the strip, and an electric conductor which is mounted on at least one flat side of the strip so as to extend in the direction of the longitudinal extension of the strip, said individual electrodes being electrically connected to said electric conductor.

2. A high-voltage electrode according to claim 1, wherein the end lying in opposition to the tip of each individual electrode is connected to the conductor.

3. A high-voltage electrode according to claim 1, wherein said electrically insulating material has a high dielectric strength.

4. A high-voltage electrode according to claim 1, wherein said strip is an insulating substrate film.

5. A high-voltage electrode according to claim 1, wherein each of said individual electrodes is electrically connected to said electric conductor by way of a resistor arranged between the conductor and the individual electrode.

6. A high-voltage electrode according to claim 5, wherein the resistor is fashioned as a ceramic substrate resistor.

7. A high-voltage electrode according to claim 6, wherein the ceramic substrate resistor has an essentially rectangular contour, comprises on one side the associated individual electrode by which the electrode is mounted on the strip, the other side of said ceramic resistor substrate being connected to the conductor.

8. A high-voltage electrode according to claim 6, wherein the ceramic substrate resistor is glued onto the flat side of the strip.

9. A high-voltage electrode according to claim 5, wherein the resistors are printed onto at least one of the two flat sides of the strip.

10. A high-voltage electrode according to claim 1, wherein the conductor is applied to at least one of the two flat sides of the strip as a circuit interconnection.

11. A high-voltage electrode according to claim 11, wherein the conductor is applied to the strip by printing.

12. A high-voltage electrode according to claim 5, wherein the individual electrodes are crimped onto one end of their associated resistor.

* * * * *